United States Patent
Belghoul

(10) Patent No.: US 9,161,302 B2
(45) Date of Patent: Oct. 13, 2015

(54) SIP SIGNALING CUT-THROUGH

(71) Applicant: Broadcom Corporation, Irvine, CA (US)

(72) Inventor: Farouk Belghoul, Campbell, CA (US)

(73) Assignee: BROADCOM CORPORATION, Irvine, CA (US)

( * ) Notice: Subject to any disclaimer, the term of this patent is extended or adjusted under 35 U.S.C. 154(b) by 242 days.

(21) Appl. No.: 13/868,953

(22) Filed: Apr. 23, 2013

(65) Prior Publication Data

US 2014/0301258 A1 Oct. 9, 2014

Related U.S. Application Data

(60) Provisional application No. 61/810,214, filed on Apr. 9, 2013.

(51) Int. Cl.
*H04W 52/02* (2009.01)

(52) U.S. Cl.
CPC ............ *H04W 52/0209* (2013.01); *Y02B 60/50* (2013.01)

(58) Field of Classification Search
CPC ... H04W 80/10; H04W 52/0209; Y02B 60/50
See application file for complete search history.

(56) References Cited

U.S. PATENT DOCUMENTS

| | | | |
|---|---|---|---|
| 2009/0135751 A1* | 5/2009 | Hodges et al. | 370/311 |
| 2010/0222023 A1* | 9/2010 | Aoyama et al. | 455/411 |
| 2012/0314650 A1 | 12/2012 | Medapalli et al. | |
| 2013/0054740 A1* | 2/2013 | Klein et al. | 709/217 |

* cited by examiner

*Primary Examiner* — Jianye Wu
(74) *Attorney, Agent, or Firm* — Foley & Lardner LLP; Christopher J. McKenna; Paul M. H. Pua

(57) ABSTRACT

Systems and methods are provided for reducing power consumption in a mobile device having a Internet Protocol (IP) multimedia subsystem (IMS) framework for supporting, e.g., Voice over Long Term Evolution (VoLTE), IP Voice over High Speed Packet Access (VoHSPA), and Rich Communication Suite (RCS) features. To support such functionality in a mobile device while reducing power consumption, a local Session Initiation Protocol (SIP) agent is implemented in, e.g., a wireless modem, of the mobile device to which SIP-related signaling can be redirected, and at which SIP-related processing can be performed when an application processor (AP) of the mobile device is in sleep mode, thereby negating a need to wake up the AP to handle such functionality.

20 Claims, 4 Drawing Sheets

SIP SIGNALING CUT-THROUGH

TECHNICAL FIELD

The technical field of the present disclosure relates to wireless communications, and in particular, to offloading certain session initiation protocol (SIP) functionality to a modem of a user equipment (UE).

BACKGROUND

A UE, e.g., a cellular telephone, smartphone, etc., operating in a wireless communications network, may have various modes of operation that may include an idle mode and a connected mode. In the idle mode, the UE may power down one or more of its operating components/elements for varying periods of time. Powering down one or more of its components assists in conserving battery power (especially as the trend continues to create smaller and smaller electronic devices), as less resources need to be supplied with power. The UE may wake up periodically to monitor paging messages applicable to that UE in case the UE must engage in some activity. Such paging messages may alert the UE to the presence of, e.g., incoming calls, and/or may provide other information. In the connected mode, the UE may actively exchange data with one or more network elements to effectuate, e.g., a voice call or a data call, etc.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Long Term Evolution (LTE), a new generation radio interface promulgated by the $3^{rd}$ Generation Partnership Project (3GPP), can refer to a follow up and evolution of the 3GPP air interface, known as Universal Mobile Telecommunications System (UMTS) (evolved UMTS Terrestrial Radio Access (E-UTRA)), and its associated radio access network, known as the UMTS Terrestrial Radio Access Network (UTRAN). LTE can be associated with higher peak data rates with reduced latency, and may improve spectral efficiency. LTE may utilize Orthogonal Frequency Division Multiplexing (OFDM) on the DL to handle multipath routing and allow for scalable bandwidths. The UL can use a single carrier combined with Frequency Division Multiple Access (FDMA) technology to allow for power-efficient transmission of the UE, where bandwidth is variable to accommodate different data rates, and where users are separated through the use of a unique time interval on an assigned frequency. Frequency separation may also be utilized if, e.g., a UE has limited transmission power/insufficient data to transmit.

Figure 1:
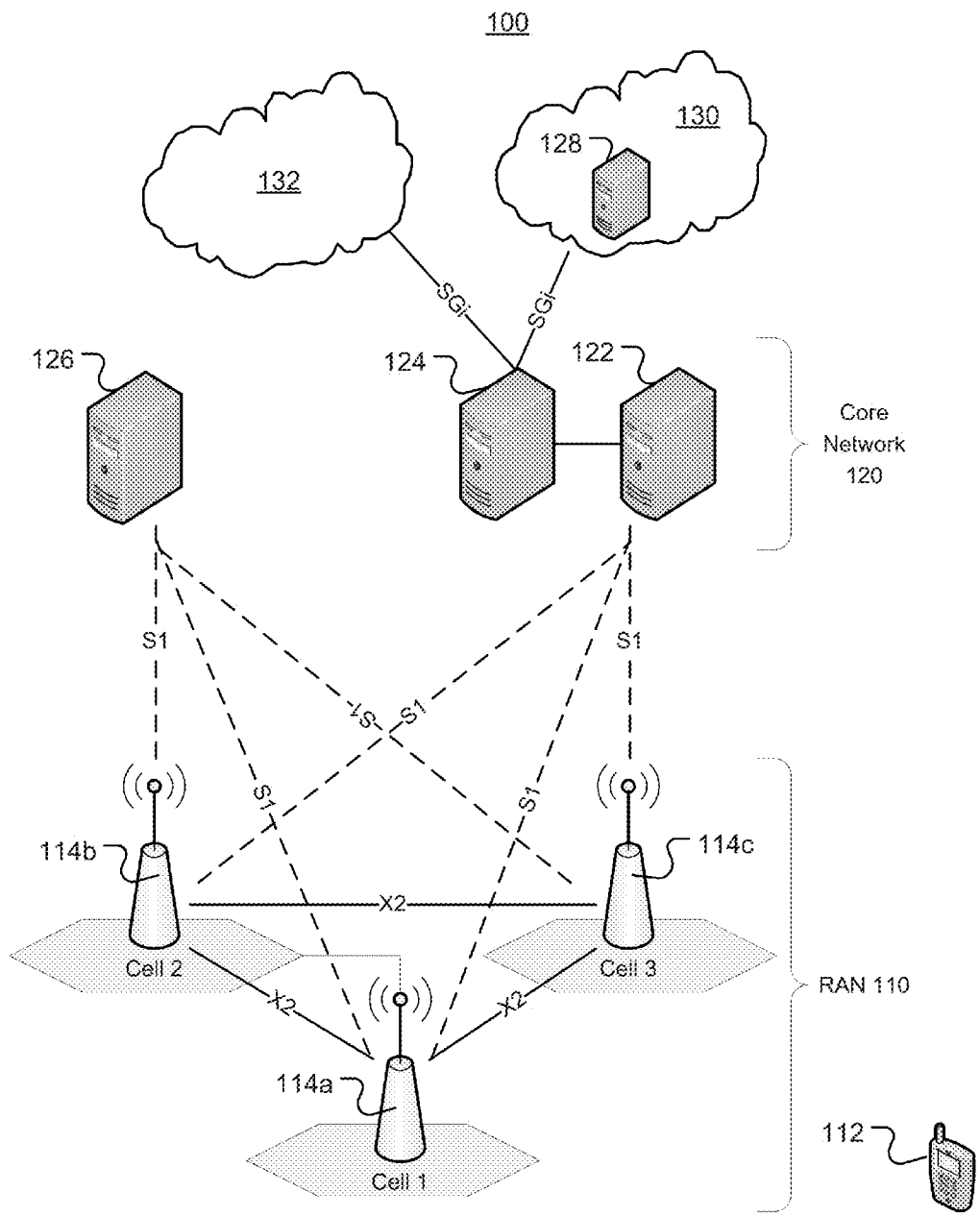
FIG. 1 illustrates an example communications network 100 in which various methods and apparatuses may be utilized in accordance with various embodiments.

FIG. 1 illustrates an example communications network 100 in which various methods and apparatuses may be utilized in accordance with various embodiments. Communications network 100 may be an LTE network or other type of wireless communications network, and may include a radio area network (RAN) 110 and a core network 120. The RAN 110 may support radio communications for UEs (such as UE 112) within its coverage area. The RAN 110 may be referred to as an Evolved Universal Terrestrial Radio Access Network (E-UTRAN), as it may employ evolved universal mobile telecommunications system (UMTS) terrestrial radio access (E-UTRA) radio technology to communicate with one or more UEs over an air interface. The RAN 110 may also be in communication with the core network 120, where the core network 120 may support various services for the UE 112.

The RAN 110 may include one or more evolved Node Bs (eNBs), which may also be referred to as base stations, Node B's, access points, etc. FIG. 1 illustrates the RAN 110 as including eNBs 114a, 114b, and 114c. It should be noted that the RAN 110 may include any number of eNBs in accordance with various embodiments. The eNBs 114a, 114b, 114c may each include one or more transceivers for communicating with the UE 112 over the aforementioned air interface.

Each of the eNBs 114a, 114b, 114c may be associated with one or more cells (e.g., Cell 1, Cell 2, and Cell 3, respectively), and may be configured to handle radio resource management decisions, handover decisions/mobility management, scheduling of users in the uplink (UL) and/or downlink (DL), etc. Communication between the eNBs 114a, 114b, and 114c may occur over an X2 interface.

The core network 120 may include various network entities, and may separate user plane and control plane traffic. In this example architecture, the core network 120, which may be referred to as an Evolved packet core (EPC), may be made up of control and user plane entities. A control plane entity referred to as a Mobility Management Entity (MME) may handle control plane traffic, while user plane traffic may be handled by a user plane entities referred to as a Serving Gateway (SGW) and a Packet Data Network (PDN) Gateway (PDN GW or PGW).

The core network 120 may facilitate communications with other networks. For example, the core network 120 may provide access (for the UE 112) to circuit-switched networks, such as the Public Switched Telephone Network (PSTN). The core network 120 may also facilitate communications between the UE 112 and land-line communications devices. For example, the core network 120 may include, or may communicate with, an Internet Protocol (IP) gateway, (e.g., an IP multimedia subsystem (IMS) server), that serves as an interface between the core network 120 and the PSTN. In addition, the core network 120 may provide the UE 112 with access to other networks, which may include other wired or wireless networks that are owned and/or operated by other service providers, or IP/data networks, such as the Internet.

For simplicity, a single SGW 122, a single PGW 124, and one MME 126 are illustrated as being included in the core network 120. The SGW 122 may support data services such as packet data, Voice-over-Internet Protocol (VoIP) communications, video, messaging, etc., and may be connected to each of the eNBs 114a, 114b, and 114c in the RAN 110 via S1 interfaces. The SGW 122 may generally route and forward user data packets to/from the UE 112. The SGW 122 may also perform other functions, such as anchoring user planes during inter-eNB handovers, triggering paging when DL data is available for the UE 112, managing and storing contexts of the UE 112, etc.

A PGW (e.g., PGW 124) may be the interface between the LTE "subsystem" and IP networks, which may include, but are not limited to, the public Internet and Internet Protocol Multimedia Subsystem (IMS) services that may be deployed within an operator core network.

An MME (e.g., MME 126) may be responsible for mobility management and path switching between eNBs at handover. The MME 126 may also perform paging for the core network 120. That is, and as illustrated in FIG. 1, the MME 126 may be connected to each of the eNBs 114a, 114b, and 114c in the RAN 110 via S1 interfaces, and may act as, alluded to above, a control node. For example, the MME 126 may be responsible for authenticating users of the UE 112, bearer activation/deactivation, selecting a particular SGW during an initial attach procedure of the UE 112, etc. The MME 126 may also provide a control plane function for switching between the RAN 110 and other RANs (not shown) that employ other radio technologies, such as the Global System for Mobile Communications (GSM) standard or the Wideband Code Division Multiple Access (WCDMA) standard. The SGW 122 may be connected to the PGW 124, which may provide the UE 112 with access to packet-switched networks, such as the aforementioned public Internet, to facilitate communications between the UE 112 and other IP-enabled devices.

While each of the foregoing elements are depicted as part of the core network 120, it will be appreciated that any one of these elements may be owned and/or operated by an entity other than the core network operator. Additionally, and in accordance with other embodiments, a pool of MMEs, a pool of PGWs, and a pool of SGWs may make up the core network 120, where an S1-flex mechanism may allow an eNB, such as eNBs 114a, 114b, and/or 114c to connect to the MME, PGW, and SGW pools for load balancing purposes.

It should be noted that the SGW 122 and the MME 126 may communicate with other entities, e.g., remote servers and terminals (not shown). Additionally, other wireless networks may include equivalent network entities. For example, a UTRAN supporting Wireless Code Division Multiple Access (WCDMA) may include the aforementioned node Bs (instead of eNBs) coupled to Radio Network Controllers (RNCs). A core network for UMTS may include Mobile Switching Centers (MSCs), Serving GPRS Support Nodes (SGSNs), and Gateway GPRS Support Nodes (GGSNs) (instead of SGWs and MMEs).

The UE 112 may communicate with one or more of the eNBs 114a, 114b, and 114c, as well as with the MME 126 and the SGW 122. The UE 112 may communicate with network entities (e.g., the eNBs 114a, 114b, and 114c) in the RAN 110 via lower layer signaling, and may communicate with network entities (e.g., the MME 126 and the SGW 122) in the core network 120 via upper layer signaling, e.g., Non Access Stratum (NAS) signaling in UMTS and LTE. The UE 112 may also be referred to as a mobile station, a terminal, an access terminal, a subscriber unit, a station, etc., and the UE 112 may be, e.g., a cellular phone, as described above, a personal digital assistant (PDA), a wireless modem, a wireless communication device, a handheld device, a laptop computer, a cordless phone, a wireless local loop (WLL) station, etc. The eNBs 114a, 114b, and 114c may broadcast system information (SI) via a broadcast channel to provide information within various SI types, each of which provides information required by UEs, (e.g., network information (mobile country code (MCC)/mobile network code (MNC) of a network), frequency synchronization parameters, and the like). SI may include the aforementioned NAS and Access Stratum (AS) SI.

As previously alluded to, the core network 120 may include, or may communicate with, e.g., an IMS server, such as IMS server 130 within an IMS network 128. IMS can refer to an access-independent IP connectivity and service control architecture that provides an IMS framework in a mobile network, such as LTE. IMS can be utilized to provide IP services in LTE, e.g., voice over LTE (VoLTE), IP Voice over High Speed Packet Access (VoHSPA), Rich Communication Suite (RCS) features, etc. In general, the IMS architecture may include one or more entities for session management and routing, service support, databases, and interworking.

To allow for integration with external IP networks, such as IP network 132, IMS may use Internet Engineering Task Force (IETF) protocols, such as the Session Initiation Protocol (SIP), where IMS may create a form of fixed-mobile convergence to thereby access multimedia and/or voice applications from a UE. This can be accomplished by having a horizontal control layer that can isolate the RAN 110 from the service layer. It should be noted that the IMS server 128 can be operatively connected to the RAN 110 and the core network 120 by way of e.g., an SGi connection/interface, where some network elements of the core network 120 and/or the RAN 110 may be used to form part of the IMS network 130. The IMS server 128 itself, may be an application server capable of hosting one or more multimedia applications/services to be used by UEs, e.g., UE 112.

SIP can refer to a session setup protocol for negotiating and establishing a media session (e.g., Real-time Transport Protocol (RTP) voice session) between two IP addresses, where text-based signaling can be used to communicate between a UE and an IMS core network, between the IMS core network and IMS/application servers, etc. That is, SIP can be used for IMS signaling and session negotiation, while RTP handles the actual transport of data. In particular, and using IMS, a UE can transmit and receive multimedia and/or voice packet switched (PS) communications via a base station (e.g., one of eNBs 114a, 114b, or 114c) implementing one or more IMS functional components.

In an IMS network, when an originating UE wishes to establish an IMS communication session with a terminating UE, the originating UE can construct a SIP INVITE request and forward it to the terminating UE's home network via a Proxy-Call Session Control Function (P-CSCF). For example, and referring to FIG. 1, a SIP message (SIP INVITE request) may be sent by UE 112 through RAN 110 and CN 120 (which can include the aforementioned IMS CN) on to IMS server 128. The P-CSCF (which may be included in the IMS CN) can process the SIP message by taking a snapshot of the Session Description Protocol (SDP) in the SIP INVITE request to retrieve the SDP information. The SIP request can then be forwarded to the originating UE's Serving-SCF (S-CSCF) (which can also be included in the CN). After receiving and validating the request, the S-CSCF may retrieve the originating UE's initial Filter Criteria (iFC) from a Home Subscriber Server (HSS), and service control logic can be executed. The execution logic may include, for example, invocation of IMS/application servers in the originating UE's home network.

Once the IMS/application server has processed the SIP INVITE request, control is returned back to the S-CSCF. The S-CSCF can determine a next hop tier the request and forwards the request to the terminating UE's Interrogating-CSCF (I-CSCF). The I-CSCF can locate the home S-CSCF of the terminating UE, and sends the request to the S-CSCF through a number of DNS and diameter queries. The IMS/application server's invocation in the terminating UE's network is similar to that described above for the originating UE's home network, where the S-CSCF forwards the request to the terminating UE's P-CSCF, and where the terminating UE receives the request. The response generated by the terminating UE traverses the same path back to the originating UE. After several forward and back SIP messages, the session establishment procedure is completed.

It should be noted that the UE described herein, i.e., UE 112, which can be a cellular telephone, is merely one example of a device that can be utilized in IMS communication. That is, most any other type of electronic device or apparatus (e.g., a server, a private branch exchange (PBX), a gateway, etc.) that can transmit and receive SIP (or even non-IMS SIP) messages may be embodied by the UE 112. Moreover, the systems in which various embodiments can be implemented are not limited to a cellular system such as that illustrated FIG. 1 and described herein. In general, cellular systems may be described as cellular networks made up of a number of radio cells, or cells that are each served by a base station or other fixed transceiver. The cells are used to cover different areas in order to provide radio coverage over an area. Example cellular telecommunication systems include Global System for Mobile Communication (GSM) protocols, Universal Mobile Telecommunications System (UMTS), LTE, as described above, and others. In addition to cellular telecommunication systems, other wireless communication systems that are suitable for the various implementations described in the present disclosure may include, but are not limited to, IEEE 802.11 wireless local area networks, IEEE 802.15.4 systems, Bluetooth systems, IEEE 802.16 WiMAX networks, etc.

Figure 2:
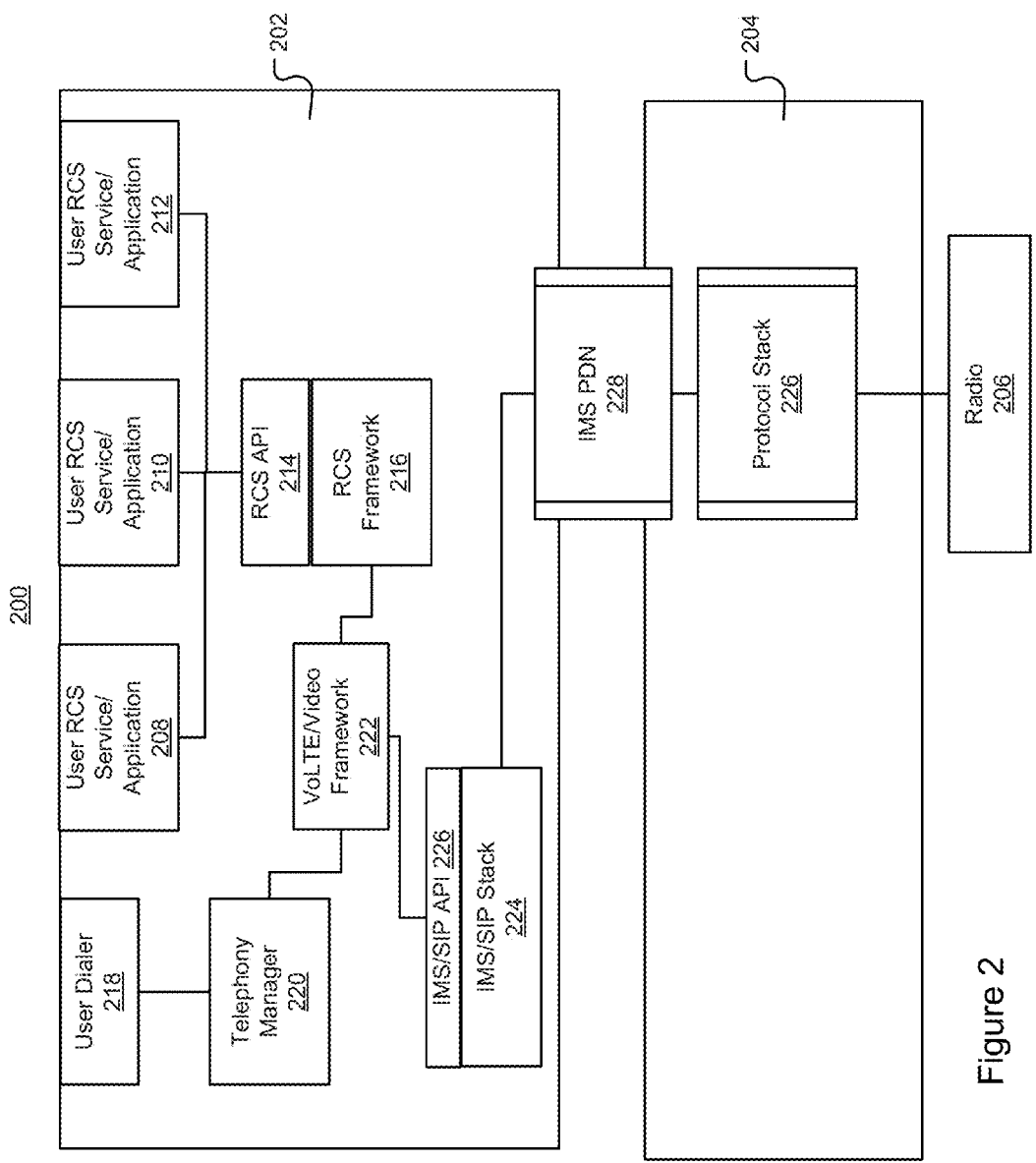
FIG. 2 illustrates an example UE, where an AP is configured to handle SIP functionality in the UE.

FIG. 2 illustrates an example UE 200, and may be one embodiment of the UE 112 of FIG. 1. UE 200 may be a smart phone, for example, which enables data communication (e.g., Internet access, email, smart phone applications, etc.) as well as voice calling. Voice calling may include, for example, circuit-switched and/or packet-switched voice calling. Packet-switched voice calling may include the aforementioned VoLTE technologies.

UE 200 may support various mobile phone technologies including 2G (e.g., Global System for Mobile Communications (GSM), etc.), 2.5G (e.g., General Packet Radio Service (GPRS), etc.), 3G (e.g., Enhanced Data for GSM Evolution (EDGE), Wideband Code Division Multiple Access (WDMA), CDMA2000, etc.), and 4G (e.g., LTE, WiMAX, etc.) technologies.

As shown in FIG. 2, UE 200 may include an application processor (AP) 202, a wireless modem 204, and a radio module 206 (e.g., a radio frequency integrated circuit (RFIC) module). It should be noted that other modules, components, and/or elements may be included in the UE 200, such as an audio codec module, a microphone, a speaker, an input mechanism such as keypad, etc.

AP 202 may enable various IP-based applications, including data, audio (e.g., voice, streaming music, etc.), and/or video applications. For example, AP 202 may support a variety of IMS/RCS-based services and/or applications, e.g., User RCS Services/Applications 208, 210, and 212. To support these applications, AP 202 may implement an RCS API 214 and RCS Framework 216. For VoLTE applications (that can work in conjunction with, e.g., a user dialer 218 and telephony manager 220) and video applications, AP 202 may support a VoLTE/Video Framework 222, which facilitates, e.g., VoLTE calls by providing an interface between VoLTE applications and lower level media carrier protocols, as well as providing, e.g., compression/decompression, encryption/decryption, and other types of processing of VoLTE application data.

In addition, AP 202 can support various protocol stacks, which are formed from various supported application layer protocols, transport layer protocols, and Internet layer protocols. AP 202 can also include various APIs to support the application layer protocols. For example, as shown in FIG. 2, AP 202 can support an IMS/SIP Stack 224 (which in turn is supported by IMS/SIP API 226), which can underlay various supported application level protocols, including, for example and without limitation, RTP and/or RTP Control Protocol (RTCP), and SIP, as alluded to previously.

AP 202 may also communicate or interface with wireless modem 204. In accordance with one embodiment, AP 202 may use wireless modem 204 as a Layer 2 (L2) pipe that provides L2 functions for IP-based traffic sent and received by AP 202. L2 functions provided by wireless modem 204 may include, without limitation, data link layer functions, Medium Access Control (MAC) layer functions, and Radio Link Control (RLC) functions. In addition, AP 202 may use wireless modem 204 for baseband processing functions, including, without limitation, channel encoding/decoding, line coding/decoding, modulation/demodulation, etc. As such, wireless modem 204 may act as a bridge between AP 202 and RFIC module 206, which is responsible for physical layer RF transmission/reception of information. Wireless modem 204 may be a mobile phone modem, which may support a variety of mobile phone technologies, including 2G (e.g., GSM, etc.), 2.5G (e.g., GPRS, etc.), 3G (EDGE, WCDMA, CMDA2000, etc.), and 4G (e.g., LTE, WiMAX, etc.).

As previously described, AP 202 may communicate or interact with wireless modem 204. This communication/interaction may be effectuated via an IMS packet data network (PDN) module 228. That is, UE 200 may be assigned an IP address to use for data packets sent to and/or from the UE 200 via a PDN connection. In the case of UE 200, which as illustrated in FIG. 2 can include multiple processing entities, i.e., AP 202 and wireless modem 204, each of which may execute applications which request network connections over the PDN, such requests may be made over the IMS PDN module 228 and protocol stack 226 using the IMS/SIP stack 224.

As also previously described, a UE may have various modes of operation that can include an idle mode and a connected (active) mode. In the idle mode, the UE may power down one or more of its operating components/elements for varying periods of time. Powering down one or more of its components assists in conserving battery power, but the UE must wake up periodically to monitor paging messages applicable to that UE in case the UE must engage in some activity.

Additionally, and as part of the operating standards/requirements for VoLTE and RCS, a UE performs IMS registration. In order to keep the IMS registration active, keep alive messages may be utilized. That is, to stay connected to a network and be able to receive incoming communications, a UE is often required to periodically send an IP message (e.g., the aforementioned keep alive message) to the network to indicate to the network that it is still connected and registered. Without such keep alive messages, the network may assume that the UE has been disconnected, and an IP address assigned to the UE can be released, re-assigned, and re-used by another UE.

In IMS, this keep alive functionality may be accomplished by sending a special SIP message from the UE, which requires the AP of the UE and its operating system to awaken from a sleep mode (during idle mode). Once that keep alive SIP message has been sent to the network, the UE operating system may return to a sleep during idle mode, followed by the AP going into idle mode.

Moreover, and also as part of the operating standards/requirements for VoLTE and RCS, replies to SIP option requests/messages that may be sent periodically by an RCS contact are required. Further still, capabilities associated with the UE may be periodically updated with the IMS network, and any RCS contacts, while voice (e.g., VoLTE) and RCS contacts' capabilities may be periodically polled by the UE.

In idle mode, the wireless modem of a UE, e.g., wireless modem 204 of UE 200 may remain in a connected/active mode in order to maintain connectivity on behalf of e.g., IMS/SIP stack 224 and radio 206. However, during idle mode, AP 202 and/or other elements of the UE 200, such as the operating system, display, etc., can transition into a sleep mode (as discussed above). To accomplish any of the aforementioned actions (i.e., sending keep alive messages, replying to periodic SIP options messages, and periodically updating and/or polling UE and voice/RCS contacts capabilities, respectively) while UE 200 is idle, and, e.g., the AP 202 is in sleep mode, the AP 202 is awakened. It should be noted that, as illustrated in FIG. 2, all SIP signaling may be performed directly in the AP 202 with the IMS/SIP stack 224. Accordingly, the need to persistently wake up, e.g., the AP 202, can have a significant impact on power consumption/battery life in UE 200.

In accordance with various embodiments, a local SIP agent can be implemented in the wireless modem of a UE. The local SIP agent can handle certain SIP mechanisms (such as the aforementioned actions that would require waking up the AP in a conventional UE) in the wireless modem. That is, and instead of SIP signaling being routed through the protocol stack and ISM PDN modules of the wireless modem and on to the IMS/STIP stack of the AP of a conventional UE, the SIP signaling may be re-directed to the local SIP agent, and handled in the wireless modem. Accordingly, the AP may remain in sleep mode, thereby improving power consumption/battery life in a UE.

Figure 3:
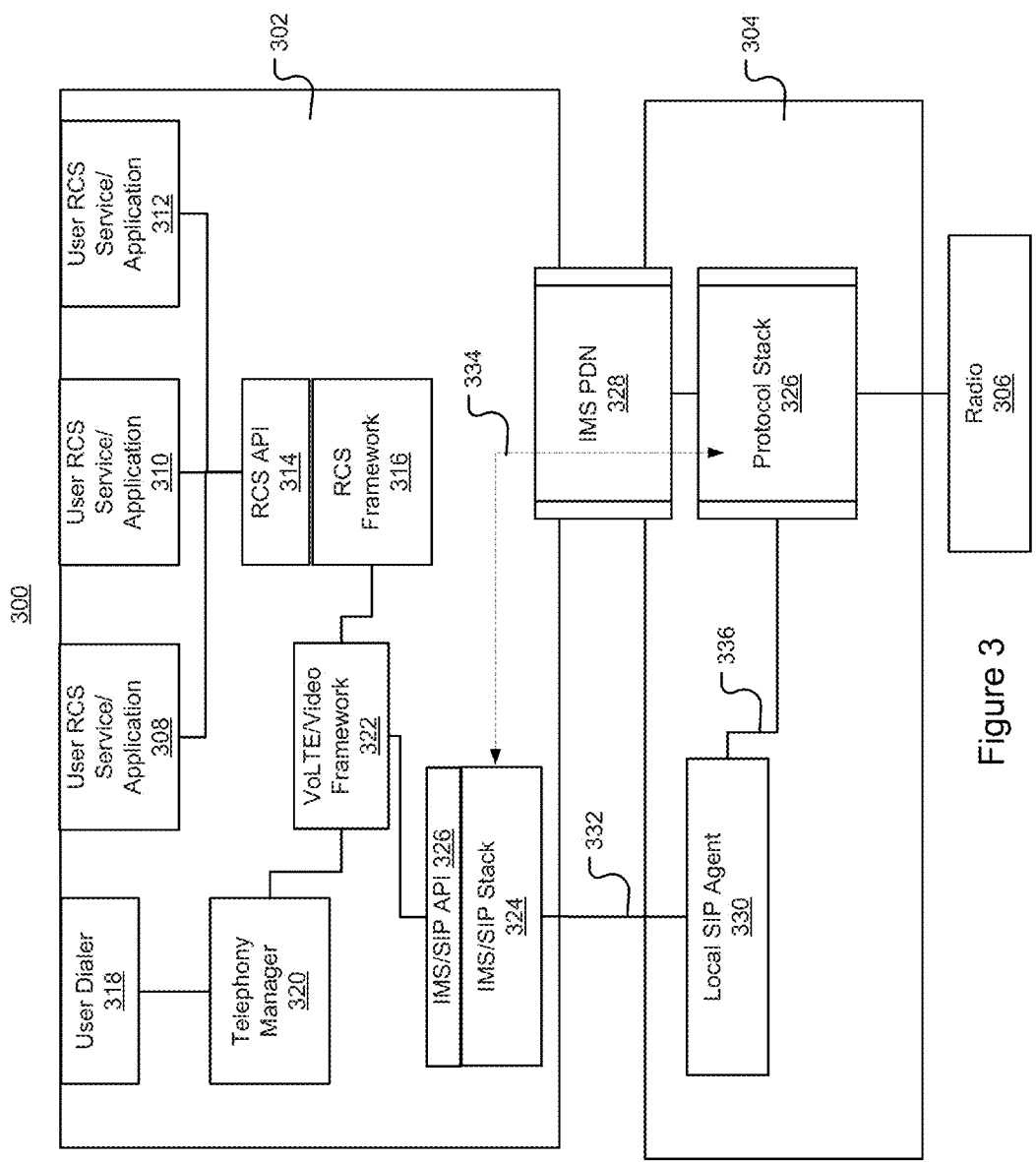
FIG. 3 illustrates an example UE in which a local SIP agent is implemented in accordance with various embodiments to handle the SIP functionality in the UE.

FIG. 3 illustrates an example UE 300 in which a local SIP agent can be implemented in accordance with various embodiments. Like UE 200 illustrated in FIG. 2, UE 300 can support various mobile phone technologies including 2G (e.g., GSM), 2.5G (e.g., GPRS), 3G (e.g., EDGE, WDMA, CDMA2000, etc.), and 4G (e.g., LTE, WiMAX, etc.) technologies. UE 300 may include an AP 302, a wireless modem 304, and a radio module 306. It should be noted that other modules, components, and/or elements may be included in the UE 300, such as an audio codec module, a microphone, a speaker, an input mechanism such as keypad, etc.

Like AP 202 of FIG. 2, AP 302 may enable various IP-based applications, and can support a variety of IMS/RCS-based services and/or applications, e.g., User RCS Services/Applications 308, 310, and 312. To support these applications, AP 302 can have implemented therein, an RCS API 314 and RCS Framework 316. For VoLTE applications (that can work in conjunction with, e.g., a user dialer 318 and telephony manager 320) and video applications, AP 302 may support a VoLTE/Video Framework 322, which facilitates, e.g., VoLTE calls by providing an interface between VoLTE applications and lower level media carrier protocols, as well as providing, e.g., compression/decompression, encryption/decryption, and other types of processing of VoLTE application data.

In addition, AP 302 can support various protocol stacks, which are formed from various supported application layer protocols, transport layer protocols, and Internet layer protocols. AP 302 can also include various APIs to support the application layer protocols, e.g., IMS/SIP Stack 324 (which in turn is supported by IMS/SIP API 326), which can underlay various supported application level protocols, including, for example and without limitation, RTP and/or RTP Control Protocol (RTCP), and SIP, as alluded to previously.

AP 302 may also communicate or interface with wireless modem 304, similar to the manner in which AP 202 communicates/interacts with wireless modem 204 of FIG. 2. In accordance with one embodiment, AP 302 may use wireless modem 304 as an L2 pipe that provides L2 functions for IP-based traffic sent and received by AP 302. L2 functions provided by wireless modem 304 may include, without limitation, data link layer functions, MAC layer functions, and RLC functions. In addition, AP 302 may use wireless modem 304 for baseband processing functions, including, without limitation, channel encoding/decoding, line coding/decoding, modulation/demodulation, etc. As such, wireless modem 304 may act as a bridge between AP 302 and radio 306, which is responsible for physical layer RF transmission/reception of information. Wireless modem 304 may be a mobile phone modem, which may support a variety of mobile phone technologies, including 2G (e.g., GSM, etc.), 2.5G (e.g., GPRS, etc.), 3G (EDGE, WCDMA, CMDA2000, etc.), and 4G (e.g., LTE, WiMAX, etc.).

The communication/interaction between AP 302 and wireless modem 304 may be effectuated via an IMS packet data network (PDN) module 328. That is, and like the UE 200 of FIG. 2, UE 300 may be assigned an IP address to use for data packets sent to and/or from the UE 300 via a PDN connection. In the case of UE 300, which as illustrated in FIG. 3 can include multiple processing entities, i.e., AP 302 and wireless modem 304, each of which may execute applications which request network connections over the PDN, such requests may be made over the IMS PDN module 328 and protocol stack 326 using the IMS/SIP stack 324.

Additionally, wireless modem 304 can include a local SIP agent 330 for handling certain SIP-related mechanisms or functions when AP 302 is in sleep mode (during idle mode). That is, local SIP agent 330 can send keep alive messages, reply to SIP options messages, periodically update/notify the network and/or RCS contacts with the capabilities of UE 300, as well as periodically poll voice and/or RCS contacts for their respective capabilities while UE 300 is in idle mode and, e.g., AP 302 is in sleep mode.

To allow local SIP agent 330 to handle the aforementioned SIP-related mechanisms/functions, the local SIP agent 330 may be operatively connected to the IMS/SIP stack 324 via connection 332. Such a connection allows the AP 302 to send any IMS-required/related parameters to the local SIP agent 330, as well as activate the local SIP agent 330 prior to the AP 302 transitioning into sleep mode. It should be noted that, the connection 332 may be effectuated using an existing application processor card interface, or may be alternatively be a dedicated connection. Furthermore, the local SIP agent 330 need not merely "duplicate" the IMS/SIP stack 324.

Moreover, SIP signaling can be routed from the radio 306, to the protocol stack 326, and on to the local SIP agent 330 for handling in those situations when the local SIP agent 330 is allowed to "replace" AP 302. For example, and instead of waking the AP 302 from sleep mode to exchange keep alive messaging, and routing keep alive messages to/from the protocol stack 326, through IMS PDN module 328, and on to IMS/SIP stack 324 of AP 302 (as illustrated by arrow 334), the local SIP agent 330 can handle the keep alive messaging. That is, SIP signaling can travel to/from radio 306 to protocol stack 326, and on to the local SIP agent 330 via a connection 336. When the AP 302 is awake, or in situations where the local SIP agent 330 is not allowed/capable of handing a SIP mechanism, the local SIP agent 330 may be deactivated, and the AP 302 can process/handle the SIP mechanism as previously described.

The connection 336 may be effectuated via a "cut-through" mechanism, such that SIP signaling that is received in the DL (sent in a default radio bearer within IMS access point name (APN)) is sent to the local SIP agent 330. That is, and to intercept such SIP signaling, a "hook" is implemented in IMS PDN module 328 such that the hook is turned on (and associated with the local SIP agent 330) when AP 302 is in sleep mode. Thus, the IMS PDN module 328 can determine, by looking at the radio resource control (RRC) layer connection (between UE 300 and a base station, e.g., eNB 114a, 114b, or 114c), whether, e.g., a message in the DL is a SIP message, and if so, the SIP message can be re-routed to the local SIP agent 330. With respect to, e.g., replying to SIP option request messages, because the local SIP agent 330 has received any requisite IMS parameters from AP 302 prior to AP 302 transitioning into sleep mode, the local SIP agent 330 can properly respond to such SIP option request messages. It should be noted that the updating of IMS-required/related parameters can be configured to occur any time AP 302 wakes up from sleep mode. That is, upon waking up from sleep mode, e.g., for some reason other than to address the aforementioned actions which have been redirected to be handled by the local SIP agent 330, AP 302 can update the IMS/SIP framework (which can include, e.g., RCS framework 316, VoLTE/video framework 322, IMS/SIP stack 324) with any state or information change(s) that may have occurred white AP 302 was in sleep mode. It should be further noted that the local SIP agent 330 can maintain any requisite timers for handling the periodic keep alive messages, as well as the periodic polling in the uplink.

Figure 4:
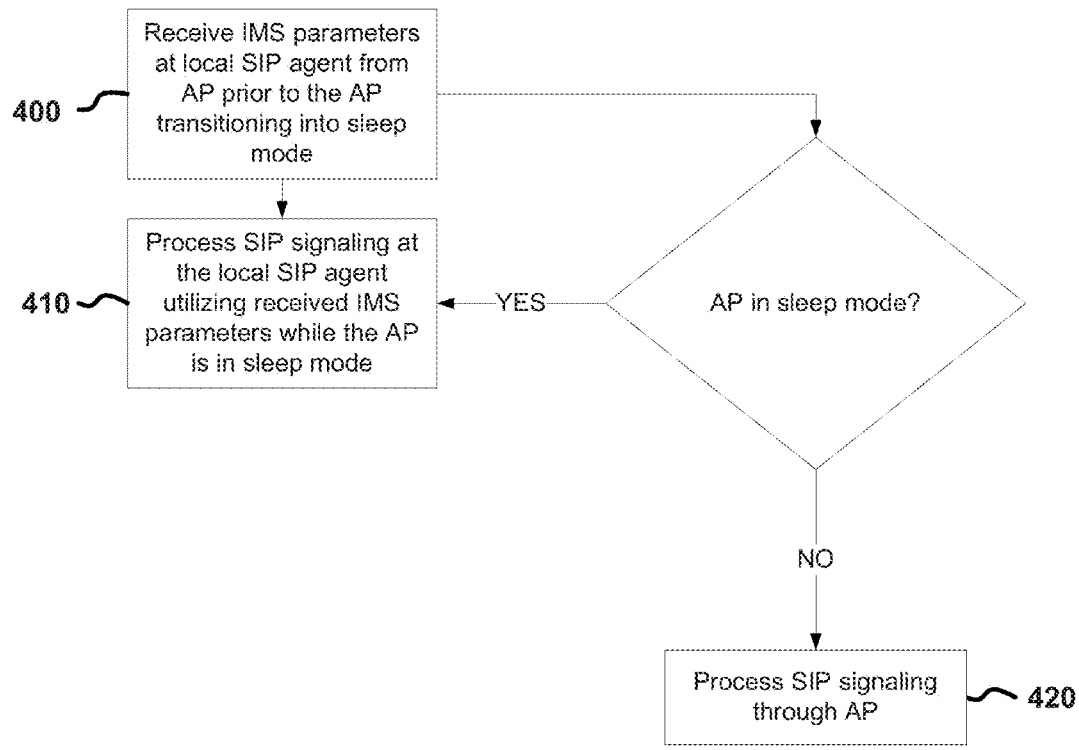
FIG. 4 illustrates example processes performed for handling SIP functionality at the local SIP agent of FIG. 3 in accordance with various embodiments.

FIG. 4 illustrates example processes performed to offload SIP-related mechanisms/functionality to a local SIP agent in accordance with various embodiments. As described above, parameters are received from an AP prior to the AP transitioning into sleep mode (400). The IMS parameters can be received at a local SIP agent implemented in a wireless modem of UE, as described previously. If the AP is in sleep mode (during idle mode), SIP signaling is processed at the local SIP agent utilizing the received IMS parameters (410). If the AP is awake, the SIP signaling is processed through the AP (420). As described above, the SIP signaling can be related to various SIP-related actions/events, such as the exchange of keep alive messages, periodic updating and polling of UE, as well as RCS and voice contact(s) capabilities, and replying to SIP options messages.

In accordance with various embodiments, use of a local SIP agent avoids the need to wake up an AP for handling SIP signaling. Thus, power consumption of a device, e.g., a UE having VoLTE and/or RCS capabilities can be reduced. Moreover, implementing the local SIP agent does not require any changes to or additional hardware to be implemented in the UE, where the local SIP agent functionality can be effectuated via a software upgrade. Further still, operation of the local SIP agent, activating/deactivating the local SIP agent, and allowing the AP to sleep can remain hidden from the network and/or network operator.

Although various embodiments have been described herein in the context of a single AP, it is contemplated that the use of a local SIP agent can be applied to scenarios where more than one AP is present. Moreover, the local SIP agent need not be applied solely in a wireless modem of a UE. For example, and in accordance with other embodiments in, the local SIP agent may be implemented in a "low power" core portion of an AP, such that the aforementioned SIP-related actions may be offloaded or redirected to this low power core portion, while other core portions of the AP remain in sleep mode. It should also be noted that the offloading of SIP signaling handling to the local SIP agent can be extended to any other appropriate IMS/SIP background activities.

The various diagrams illustrating various embodiments may depict an example architectural or other configuration for the various embodiments, which is done to aid in understanding the features and functionality that can be included in those embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. In addition, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality is presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   receiving Internet Protocol multimedia subsystem (IMS) parameters at a local Session Initiation Protocol (SIP) agent from an application processor (AP) prior to the AP transitioning into sleep mode;
   redirecting, via a hook associated with the local SIP agent at an IMS packet data network (PDN) module bridging the AP and a wireless modem, SIP signaling to the local SIP agent while the AP is in sleep mode; and
   processing the SIP signaling at the local SIP agent utilizing the received IMS parameters while the AP is in sleep mode.

2. The method of claim 1 further comprising, activating the local SIP agent subsequent to receiving the IMS parameters.

3. The method of claim 1, wherein the SIP signaling is received in a downlink channel.

4. The method of claim 1, wherein the IMS parameters are received at the local SIP agent via an AP card interface or a dedicated connection between the local SIP agent and an IMS/SIP stack implemented at the AP.

5. The method of claim 4, wherein the IMS/SIP stack is configured to handle processing of the SIP signaling if the AP is awake.

6. The method of claim 1, wherein the IMS parameters are received at the local SIP agent via a connection or interface separate from the PDN module bridging the AP and the wireless modem.

7. The method of claim 6, wherein the hook instructs the IMS PDN to analyze a radio resource control (RRC) layer connection to determine if a message received in a downlink channel is associated with the SIP signaling.

8. The method of claim 1, wherein the IMS parameters are updated in accordance with at least one of state and information Kleines occurring while the AP is in sleep mode.

9. The method of claim 8, wherein the IMS parameters are updated in an IMS/SIP framework of the AP when the AP wakes from sleep mode.

10. The method of claim 1, wherein the SIP signaling is associated with keep alive messaging, wherein the keep alive messaging is performed in accordance with a timer maintained at the local SIP agent.

11. The method of claim 1, wherein the SIP signaling is associated with SIP options requests, and wherein the local SIP agent responds to the SIP options requests.

12. The method of claim 1, wherein the SIP signaling is associated with messages transmitted by the local SIP agent to at least one of a network and Rich Communication Suite contacts for periodically updating capabilities of a user equipment in which the local SIP agent and the AP are implemented.

13. The method of claim 1, wherein the SIP signaling is associated periodic polling of voice and Rich Communication Suite contacts to obtain updated capabilities of the voice and Rich Communication Suite contacts, and wherein the periodic polling is performed in accordance with a timer maintained at the local SIP agent.

14. An apparatus, comprising:
   an application processor (AP) including an Internet Protocol multimedia subsystem (IMS)/Session Initiation Protocol (SIP) framework;
   a modem including a local SIP agent configured for handling SIP functions associated with SIP signaling redirected to the local SIP agent while the AP is in sleep mode; and
   a hook at an IMS packet data network (PDN) module bridging the AP and the modem, configured to redirect the SIP signaling to the local SIP agent while the AP is in sleep mode.

15. The apparatus of claim 14, wherein the SIP signaling comprises at least one of SIP keep alive messages received on a downlink channel between the apparatus and a base station serving the apparatus, SIP options request messages requesting capabilities of the apparatus.

16. The apparatus of claim 14, wherein the SIP functions include at least one of periodically polling voice and Rich Communication Suite (RCS) contacts of the apparatus for capabilities associated with the voice and RCS contacts, and periodically updating at least one of a network in which the apparatus is operative, and contacts of the apparatus.

17. The apparatus of claim 14, wherein the local SIP agent receives IMS-required parameters for the handling of the SIP functions from the AP prior to the AP transitioning into the sleep mode.

18. An apparatus, comprising:
an application processor (AP);
a radio module for receiving and transmitting Session Initiation Protocol (SIP)-related messages on a downlink channel and uplink channel, respectively; and
a wireless modem operatively connected to the radio module and to the AP for:
routing the SIP-related messages to and from a local SIP agent when the AP is asleep and the apparatus is in idle mode, the routing comprising redirecting, via a hook associated with the local SIP agent at an IMS packet data network (PDN) module bridging the AP and the wireless modem, a first SIP-related message to the local SIP agent while the AP is in sleep mode; and
routing the SIP-related messages to and from the AP when the AP is awake.

19. The apparatus of claim 18, wherein the AP comprises an IMS/SIP stack module operatively connected to the local SIP agent, the IMS/SIP stack module transferring IMS parameters utilized for processing the SIP-related messages.

20. The apparatus of claim of 19, wherein the transferring of the IMS parameters occurs when the AP is awake.

* * * * *